United States Patent
Tatomirescu et al.

(10) Patent No.: US 9,537,210 B2
(45) Date of Patent: Jan. 3, 2017

(54) ANTENNA CARD FOR CONTROLLING AND TUNING ANTENNA ISOLATION TO SUPPORT CARRIER AGGREGATION

(71) Applicant: Intel IP Corporation, Santa Clara, CA (US)

(72) Inventors: Alexandru Daniel Tatomirescu, Aalborg (DK); Poul Olesen, Stoevring (DK); Gert Pedersen, Storvorde (DK); Emil Buskgaard, Aalborg (DK); Samantha Caporal Del Barrio, Aalborg (DK); Pevand Bahramzy, Nørresundby (DK); Peter Bundgaard, Aalborg (DK); Simon Svendsen, Aalborg (DK); Ole Jagielski, Frederikshavn (DK); Boyan Yanakiev, Aalborg (DK)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/668,515

(22) Filed: Mar. 25, 2015

(65) Prior Publication Data

US 2016/0285160 A1 Sep. 29, 2016

(51) Int. Cl.
*H01Q 1/00* (2006.01)
*H01Q 1/24* (2006.01)
(Continued)

(52) U.S. Cl.
CPC ............... *H01Q 1/525* (2013.01); *H01Q 1/38* (2013.01); *H04B 1/40* (2013.01); *H04B 7/0404* (2013.01)

(58) Field of Classification Search
USPC ..... 455/90.1, 450, 78, 103, 126, 562.1, 436, 455/67.11, 423; 343/836, 767, 745, 770, 343/702, 722, 860, 750, 858, 730, 841
See application file for complete search history.

(56) References Cited

U.S. PATENT DOCUMENTS

2003/0193437 A1* 10/2003 Kangasvieri ........... H01Q 1/243
 343/702
2009/0124215 A1* 5/2009 Nysen .................. H01Q 1/2275
 455/90.1

(Continued)

FOREIGN PATENT DOCUMENTS

CN 106025548 A 10/2016
WO WO-2013136050 A1 9/2013

OTHER PUBLICATIONS

European Application Serial No. 16154584.3, Extended European Search Report mailed Aug. 18, 2016, 10 pgs.

(Continued)

*Primary Examiner* — Ganiyu A Hanidu
(74) *Attorney, Agent, or Firm* — Schwegman Lundberg & Woessner, P.A.

(57) ABSTRACT

An apparatus and method to provide isolation between a first antenna and a second antenna, each of which is located on a ground plane. A slot that is tunable by a variable reactance is located on the ground plane, the slot not being appreciably resonant at the operating frequency of the first antenna and the second antenna. The antennas operate in an orthogonal mode. Varying the slot reactance varies the electrical distance over which the coupling current between the two antennas flows. Increased RF isolation to a desired magnitude results by maintaining the orthogonality at desired bands. The RF isolation can be measured and a departure from the desired magnitude of isolation causes the reactance to be varied to increase the RF isolation back to the desired magnitude. The antennas and the slot are placed at locations on the ground plane of high current density.

27 Claims, 12 Drawing Sheets

(51) Int. Cl.
   *H01Q 1/52*   (2006.01)
   *H01Q 1/38*   (2006.01)
   *H04B 1/40*   (2015.01)
   *H04B 7/04*   (2006.01)

(56) References Cited

U.S. PATENT DOCUMENTS

| | | | | |
|---|---|---|---|---|
| 2009/0262028 | A1* | 10/2009 | Mumbru | H01Q 1/243 |
| | | | | 343/702 |
| 2010/0013720 | A1* | 1/2010 | Sakata | H01Q 9/42 |
| | | | | 343/702 |
| 2010/0210272 | A1* | 8/2010 | Sundstrom | H04B 1/0082 |
| | | | | 455/450 |
| 2010/0238079 | A1* | 9/2010 | Ayatollahi | H01Q 1/243 |
| | | | | 343/729 |
| 2011/0260939 | A1* | 10/2011 | Korva | H01Q 1/243 |
| | | | | 343/725 |
| 2012/0169552 | A1* | 7/2012 | Lee | H01Q 9/285 |
| | | | | 343/727 |
| 2012/0274522 | A1* | 11/2012 | Ayatollahi | H01Q 1/243 |
| | | | | 343/745 |
| 2013/0293425 | A1 | 11/2013 | Zhu et al. | |
| 2014/0043201 | A1 | 2/2014 | Pelosi et al. | |
| 2015/0092623 | A1* | 4/2015 | Svendsen | H01Q 13/103 |
| | | | | 370/278 |

OTHER PUBLICATIONS

Szini, Istvan, et al., "On small terminal MIMO antenna correlation optimization adopting characteristic mode theory", 2013 IEEE Antennas and Propagation Society International Symposium (APSURSI), IEEE. XP032645536, (Jul. 6, 2014), 1425-1426.

* cited by examiner

ANTENNA CARD FOR CONTROLLING AND TUNING ANTENNA ISOLATION TO SUPPORT CARRIER AGGREGATION

TECHNICAL FIELD

Some embodiments relate to antennas for wireless or cellular communications. Some embodiments relate to 3rd Generation Partnership Project (3GPP) Long Term Evolution (LTE) networks.

BACKGROUND

Mutual coupling between multiple antennas placed on the same platform of a mobile device is a limiting factor for even the design of multiple input-multiple output (MIMO) antennas where moderate levels of isolation are required. When the low bands used in Long Term Evolution (LTE) are considered, the antennas use the whole PCB for radiation and mutual coupling increases dramatically. In specific applications there is need for even higher isolation than currently used levels. As one example, at least one architecture requires 25 dB isolation as the required antenna isolation for all bands of operation, even at low band. There is a need for an antenna isolation structure that can control antenna isolation and can optimize it for a whole frequency interval, not just a fraction of the interval.

DESCRIPTION OF EMBODIMENTS

Figure 1:
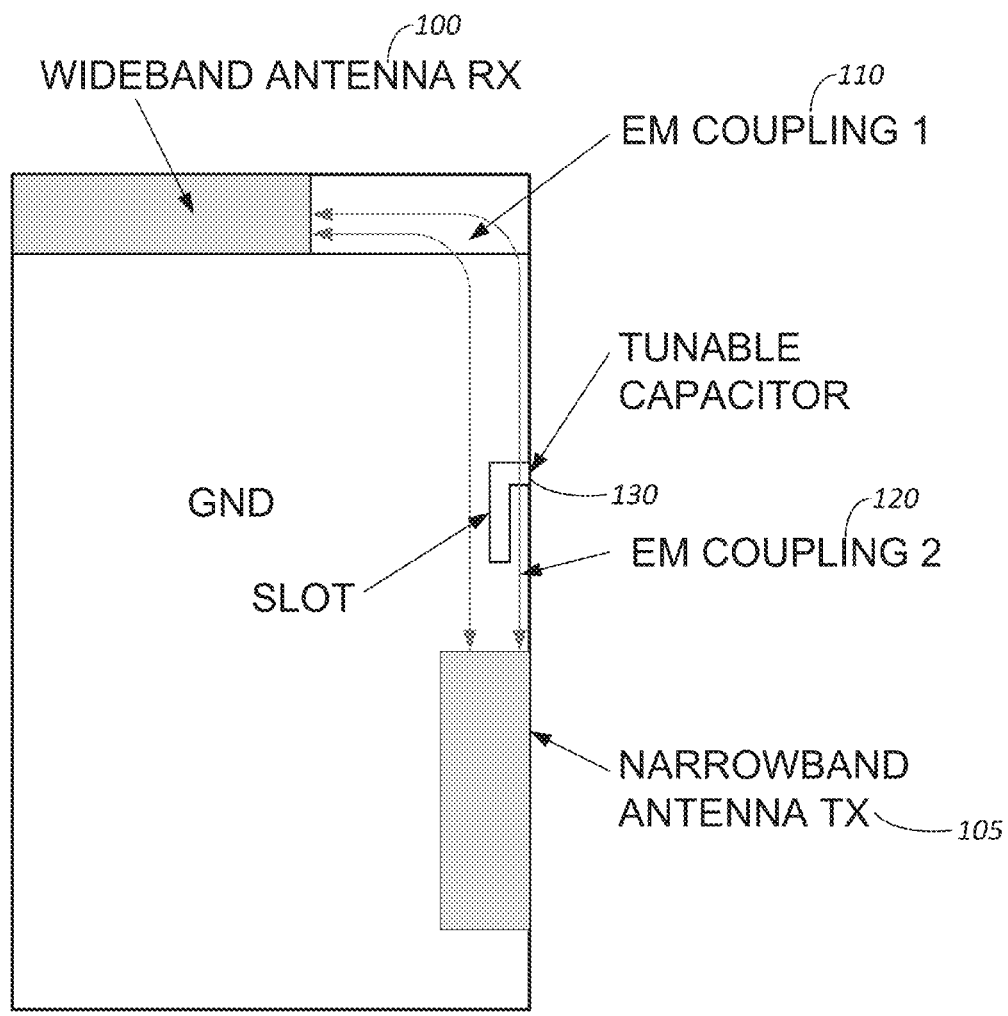
FIG. 1 illustrates an apparatus for antenna isolation using a tunable slot according to some embodiments.

For antenna front ends for smart phones and similar mobile devices, antenna isolation is of major importance. Thus, developing an isolation mechanism that can reliable, versatile and practical is crucial for success. Practical issues are encountered in implementing decoupling methods into products. Many methods relay on clearly defined near field distribution and symmetry in order to achieve decoupling. Perturbation of the near field will severely hinder performance. From the smart device front end antenna perspective, the most difficult requirements are for intraband contiguous Carrier Aggregation (CA) because the system relies on narrowband tunable antennas to achieve isolation. In this context a narrowband antenna means an antenna that covers less than the RX antenna or TX antenna part of a band at any given instant.

For the low bands (699-960 MHz) used in LTE, the antennas use substantially the entire printed circuit board (PCB) for radiation and mutual coupling increases dramatically compared to antennas with a large physical separation. To achieve very high data rates required in the uses discussed, it is necessary to increase the transmission bandwidth versus single carrier or channel. Further, this must be accomplished for Carrier Aggregation (CA). Utilizing more than one carrier with LTE advanced CA increases the overall transmission bandwidth. CA is a topic that is receiving a substantial amount of attention for both industry and academies and it is one of the key features announced for LTE release 11 and 12. There are three types of CA defined:

Interband CA: CA of component carriers in different operating bands.

Intraband contiguous CA: Contiguous carriers aggregated in the same operating band.

Intraband noncontiguous CA: Noncontiguous carriers aggregated in the same operating band.

Carriers aggregated in each band can be contiguous or noncontiguous, meaning that in the same band the carriers are in adjacent cannels or not in adjacent channels. Because CA requires multiple bands to be covered simultaneously, traditional approaches used with narrow band antennas are not sufficient. To obtain an impressive 25 dB of isolation in one embodiment, there is still a need to manipulate the feeding position and the design of the exciting elements for desired isolation. However, there are a number of practical limitations during product design and implementation. Because the high level of integration and miniaturization in a mobile phone, provides little freedom for the antenna design. Furthermore, to optimize the performance a number of use cases should be considered. Since the isolation is dictated by the near-field distribution, any extreme perturbation (e.g, the phone lying on a metal surface, or a user interfering with the antennas) could be disastrous for the isolation mechanism.

To control the isolation mechanism and to provide an extra degree of freedom in the design process, a simple structure can be used that can control the isolation between antennas and can improve or optimize the isolation for a whole frequency interval, not just a fraction of it. Any types of antennas would operate for embodiments. There would be in some embodiments a first antenna and a second antenna but for ease of description the embodiments will be described in terms of a TX antenna and a RX antenna. But the embodiments need not be limited to TX antenna and RX antenna types.

The structure is a slot that is placed on the edge of the PCB between the TX antenna and RX antenna. The shape of the slot can be optimized for the application. When used with a shunt capacitor, the slot acts as a choke for the coupling current only for a relatively narrow frequency interval. Depending on the value of the capacitor, it also modifies the electrical distance over which the coupling current flows between the feeding points of the two antennas. This is very useful when trying to optimize the isolation for a wider frequency interval because the ground plane changes its electrical size over frequency. In addition, the exact placement of the slot is less important than that of the feeding points, so for a design that is heavily constrained, for example by the mechanics of the phone, this solution offers an important degree of freedom especially in the latter stages of the design process.

Described is a method and apparatus to control decoupling of a RX antenna and a TX antenna. This is achieved through the use of characteristic mode theory. Characteristic mode theory is well known and well reported on in the literature, and comprises a method used in electromagnetics to solve for currents and fields generated by a scattering object. The object can be any size or material. When an electromagnetic wave is scattered by the object, currents are induced on the object which subsequently reradiates electromagnetic energy. The structure of the currents and fields is unique to the physical dimensions of the scatterer and the incident frequency of radiation. From this perspective, a scatterer can be viewed as a parasitic antenna that radiates electromagnetic radiation in the same way as the original incident wave was radiated. Practical antenna elements are used to excite different characteristic modes of the PCB to achieve high levels of isolation for a wireless system that has dedicated antennas for RX and TX, through the use of orthogonal radiation modes which are obtained through application of characteristic mode theory. Stated another way, the disclosed mechanism controls the relationship between different characteristic modes in order to provide a degree of freedom in the antenna design and during use of the final product.

FIG. 1 illustrates an apparatus for antenna isolation using a tunable slot according to some embodiments. The apparatus comprises a slot with a variable reactance to control the electrical distance over which the coupling current flows between the RX antenna 100 and TX antenna 105. Initially, the antennas may be decoupled to perhaps a reasonable −20 dB. However, because of a need for a very, very high level of isolation, the variable reactance and slot can be used to add significant additional isolation, or decoupling, of the antennas. In some embodiments the variable reactance is a variable capacitor. In some embodiments the variable reactance is a variable inductor. In some embodiments the variable reactance comprises at least one switch to vary the electrical length of the slot. For ease of illustration, the written description of this specification describes embodiments where the variable reactance is a variable capacitor that is used to vary the electrical distance of the coupling current path. However, those of ordinary skill in the art will appreciate that the embodiments may include the case where the variable reactance is a variable inductance that is used to vary the electrical distance of the coupling current path. Other embodiments may include the case where the variable reactance comprises at least one switch to vary the electrical distance of the coupling current path by varying the length of the slot.

The slot does not resonate in the frequency band at which the RX antenna 100 and the TX antenna 105 operate. In other words, the slot is not a parasitic scatterer. Because the slot is not resonant in the band at which the RX antenna 100 and the TX antenna 105 operate, it does not introduce extra loss but rather makes use of the unique topology of the PCB which has been found experimentally to have an asymmetric excitation. The currents in the embodiment under discussion run mostly on the edges of the board and this asymmetry leads to the board having stronger coupling currents on one side than on the other. The slot and the capacitor are used to tune the electrical length of the coupling current path, not to cancel the coupling current. In FIG. 1, operation of capacitive tuning of the slot illustrates two extremes illustrated by two coupling current paths; a low capacitance (FM coupling 1) path and a high capacitance (EM coupling 2) path so that the tunable capacitor behaves almost like a switch, with many stages in between the on and off conditions. This illustration is for a wideband RX antenna 100 and a narrowband TX antenna 105 but will work for other antenna combinations as well. There could be a combination of wideband antennas predominantly exciting the same or different characteristic modes. In fact, any combination of wideband or narrowband antenna elements that use inductive or capacitive excitation of the same or different characteristic modes can have the decoupling improved by the use of the slot. For a large value of the tunable capacitor, the slot is essentially bypassed and the coupling path is shortest as seen at 110. For a small value of the tunable capacitor, the coupling path is longest as seen at 120. For capacitor values between these two values, intermediate coupling paths result.

FIG. 1 illustrates the current distribution at resonance frequency of the narrowband TX antenna 105 when the wideband RX antenna 100 is excited. There is coupling current running from the RX antenna 100 through the slot and on to the narrowband TX antenna 105 even though the slot 120 is tuned for optimized isolation. This is unlike traditional isolation slots between a first antenna and a second antenna where the current density around the slot increases specifically because the slot is in resonance at the functioning frequency of the antennas. Further, in this traditional isolation there is substantially no current running through the slot on to the second antenna. On the contrary, the slot described herein acts more as an alternative route for the coupling current that induces radiation in one antenna by another antenna and as a device to manipulate the minimum of the current density of the coupling current. In other words, the tunable slot described herein, being non-resonant at the operating frequency of the antennas, has the objective of changing the path of the coupling current from the RX antenna to the TX antenna and vice versa thus changing the coupling between the antennas. This alternative path ensures that the amplitude of the coupling current can be minimized or the phase can be changed so that it is orthogonal to that induced by the antenna's radiation mode. Stated another way, the change in the path over which the coupling current runs from a first antenna to the a second antenna is mutual in that the tunable slot also changes the way the coupling current runs from the second antenna to the first antenna. This is very useful for compensating any potential perturbations in the near field that would change the relationship between the modes, discussed in more detail below.

An example of providing decoupling by changing the routing of the coupling current is the coupling between two monopoles on the edge of a ground plane. As a first case, at λ/2 distance (half a wavelength away) between two monopole antennas, the two monopoles are decoupled because each of them has a minimum in the current distribution at the adjacent monopole feed. The same effect can be achieved with the same monopoles now λ/3 apart and with a slot in between the antennas that makes the coupling current path λ/2 long as in the first case. This change in electrical distance for the coupling currents will increase the isolation between the monopoles that are now λ/3 apart but probably not to the level of the λ/2 spaced monopoles. There is a tradeoff because the more coupling between the antennas, the less effective the slot is at decoupling the antennas. The tunable slot is a very effective apparatus for controlling the electrical distance over which the coupling current flows between the antennas, as opposed to attempting to cancel the coupling current.

Figure 1A:
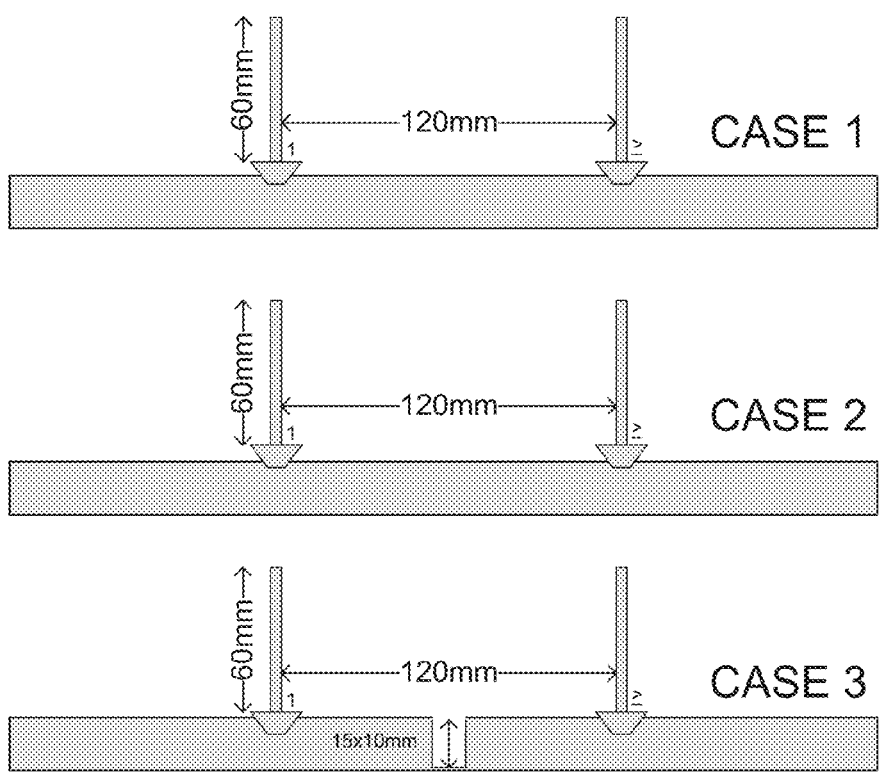
FIG. 1A illustrates an example of decoupling by changing the routing of the coupling current between two monopoles on the edge of a ground plane according to some embodiments.
Figure 1B:
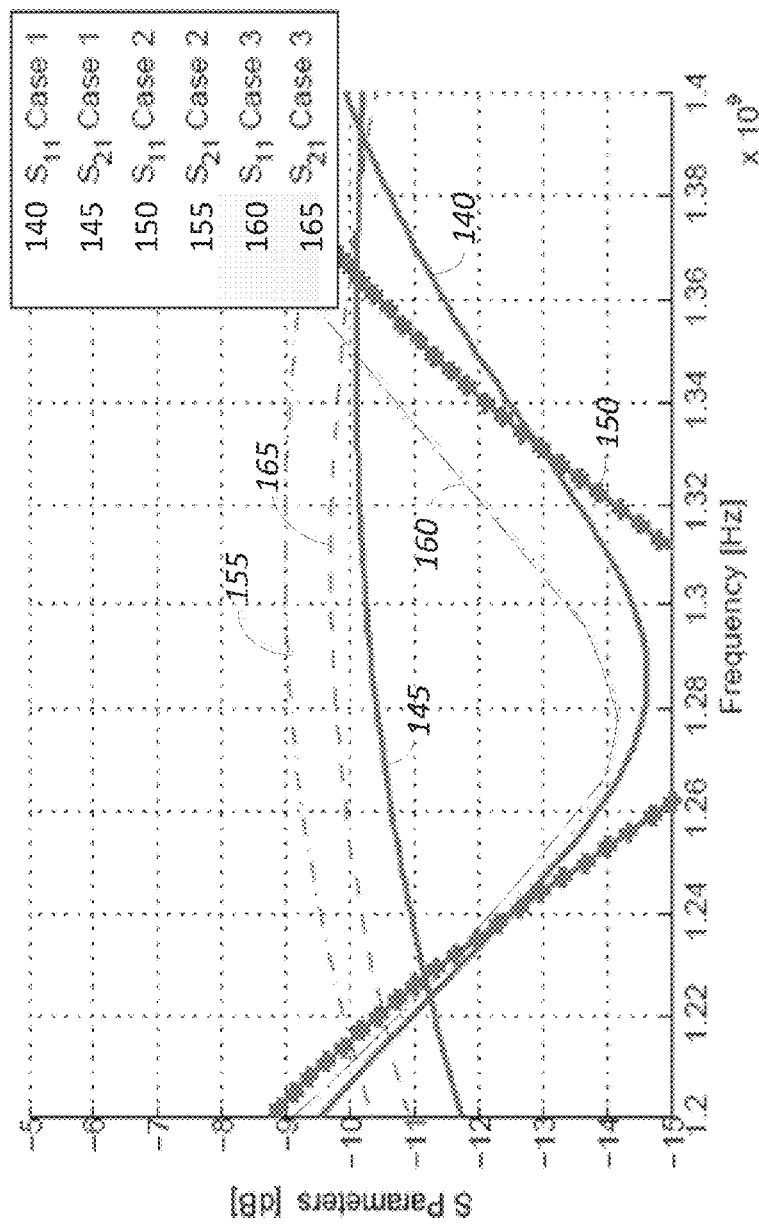
FIG. 1B illustrates S parameters of the two monopoles of FIG. 1A according to some embodiments.

An illustrative example of the foregoing decoupling is seen in FIGS. 1A and 1B where the effect of the slot is shown on the coupling between two monopoles. FIG. 1A illustrates an example of decoupling by changing the routing of the coupling current between two monopoles on the edge of a ground plane according to some embodiments. In FIG. 1A Case 1 refers to two monopoles 125, 135 on a large ground plane spaced at half wavelength, in this case 120 mm. Case 2 shows the same two monopoles as in Case 1 but spaced closer than half wavelength, at 100 mm. Case 3 shows the monopoles spaced as in Case 2 but with a slot to increase the electrical distance of the two monopoles to more nearly that of Case 1. FIG. 1B illustrates S parameters of the two monopoles 125, 135 of FIG. 1A according to some embodiments. S11 (140) and S21 (145) of Case 1 may be used as reference S parameters for the two monopoles spaced at half wavelength. S11 (150) and S21 (155) for Case 2 differ significantly from the reference S parameters at Case 1. S11 (160) and S21 (165) for Case 3 are much closer to the reference S parameters of case 1, namely S11 (140) Case 1 and S21 (145) Case 1. The S parameter curves of FIG. 1B show that the slot offers a decoupling level for Case 3 that is a substantially similar to the decoupling level for Case 1, but at the closer distance between the monopoles in Case 2, because the slot manipulated the minimum of the coupling current of Case 2 to be similar to Case 1.

Referring again to FIG. 1, the size of the slot affects the operating frequency interval in that the bigger the slot the more tuning is possible. Also, an effort should be made to place the slot on the edge of the ground plane at 130 where the current density is highest and the slot would be most effective. The RX antenna and the TX antenna are placed similarly. The slot should be placed on the path of the main coupling current. Size and placement of the slot may be accomplished experimentally, working within certain guidelines or specifications. For example, guidelines for the product in which the antennas are to be used may be used as a starting point. Then the parameters such as placement close to the edge of the board, practical placement in terms of the guidelines, and board real estate available should be taken into account. As to real estate, if the board size and other components allow only, say, 5 cm distance between the antennas, but 6 cm is needed, the slot can provide that the 5 cm distance acts electrically as if it were the needed 6 cm, giving a certain degree of design freedom not otherwise available. Other parameters in the design include the size of the slot, and optimum tuning range and effectiveness of the slot in terms of isolation and antenna performance. These types of factors can be measured experimentally and adjusted as needed when designing a slot embodiment.

A tunable slot embodiment would work as well with bigger size ground planes including but not limited to laptops. desk computers, ipods and tablets. In these cases orthogonality between the antennas can be maintained substantially constant over frequency but the ground plane changes electrically with the frequency. Further, orthogonality can be achieved in additional ways. Examples include using monopoles that excite different modes of the ground plane, the simplest case being cross polarized antennas, or a magnetic loop and a monopole. A slot embodiment such as, or similar to, those described can be used to adjust the orthogonality between these antenna modes over different frequencies or ground plane designs.

Figure 2:
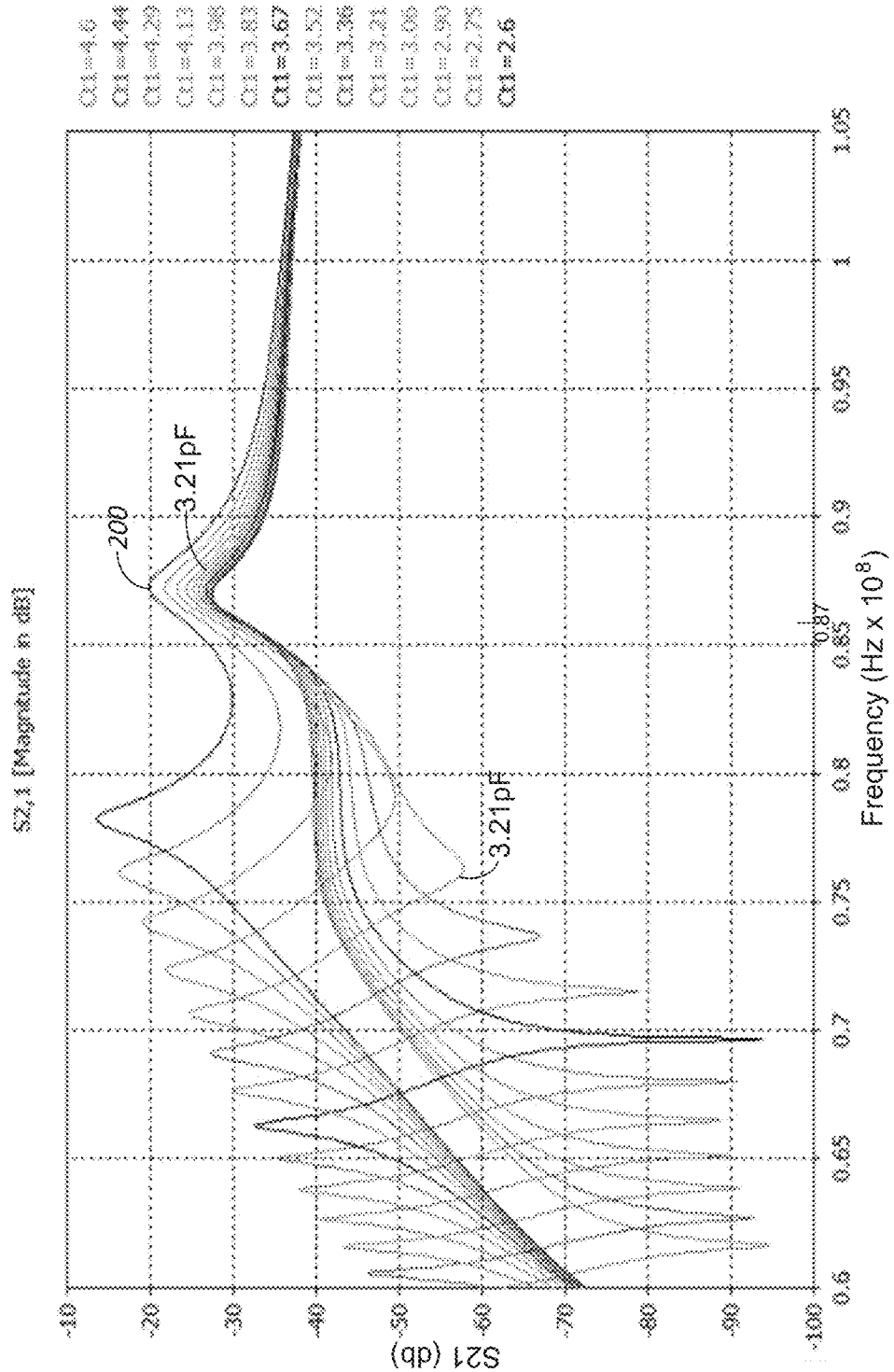
FIG. 2 illustrates the S21 parameter of a transmit (TX) antenna and a receive (RX) antenna according to some embodiments.

FIG. 2 illustrates the S21 of the TX antenna and the RX antenna for an embodiment similar to FIG. 1. S-parameters are well known in the art and describe the input-output relationship between ports (or terminals) in an electrical system. If there are two ports, Port 1 and Port 2, then S12 represents the power transferred from Port 2 to Port 1. S21, on the other hand represents the power transferred from Port 1 to Port 2. Therefore, FIG. 2 illustrates isolation, or electrical coupling, between the RX antenna and the TX antenna that is provided by the slot at various values of the variable capacitor. FIG. 2 also illustrates the frequency of resonance the slot. The frequency at which the two antennas are functioning is shown as 870 MHz, which is the frequency at which isolation is desired. The magnitude of isolation is shown by the peak 200 at 870 MHz as a function of capacitive value at the slot. FIG. 2 also illustrates a second peak that is shifting according to the frequency at which the slot is resonating for the respective capacitive values. As can be seen, a capacitive value for the slot of 3.21 pico Farads (pF) provides a resonant frequency of the slot that is between 750 MHz and 800 MHz, which is essentially outside the frequency at which the antennas are functioning. This provides an improvement of 7 dB at the point indicated as 3.21 pF in FIG. 2, from −20 dB at 200 (mentioned above as the initial decoupling) to about −27 dB.

Figure 3:
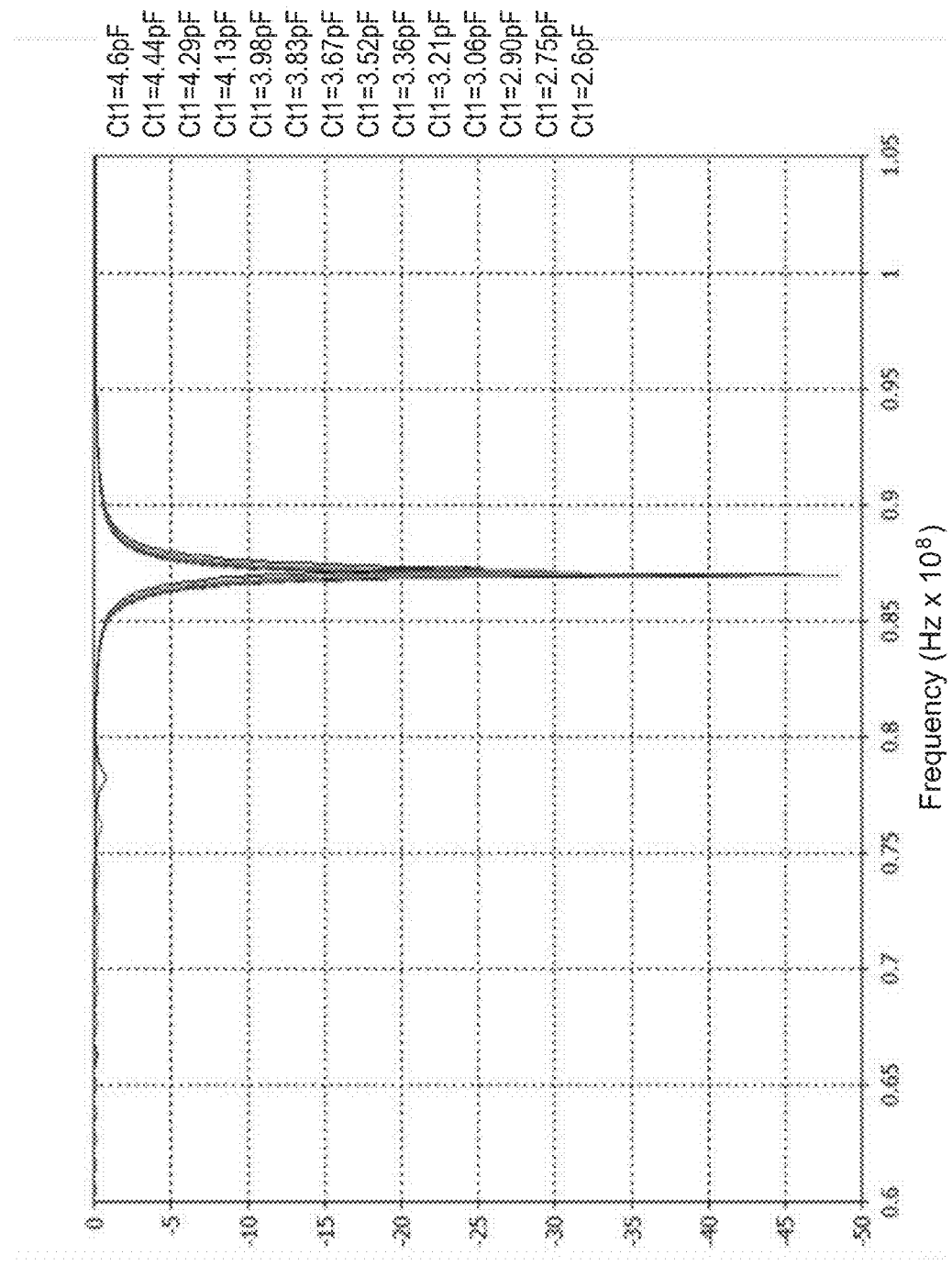
FIG. 3 illustrates the input reflection coefficient for the TX antenna for different values of a tuning capacitor for a ground plane slot according to some embodiments.

FIG. 3 illustrates the input reflection coefficient for the TX antenna 105 of FIG. 1 for different values of the tuning capacitor for a ground plane slot, according to some embodiments. As can be seen from FIG. 3, the impact of the slot tuning on the input impedance of the antennas is negligible. This is useful because the slot does not affect the performance of the antennas, it just modifies the coupling between them.

Figure 4:
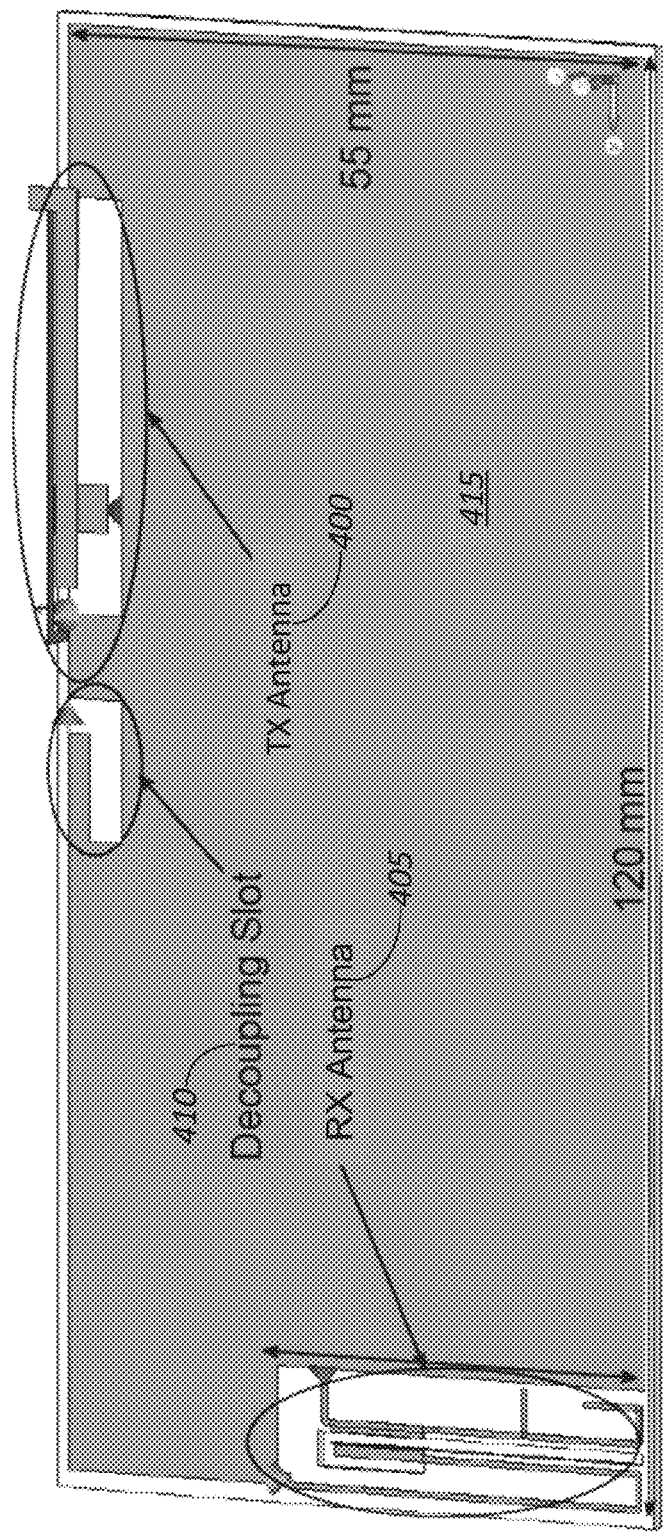
FIG. 4 illustrates a ground slot for controlling and tuning antenna isolation according to some embodiments.

In order to achieve the required target for isolation, the design of the antennas and their placement on the PCB board should be optimized to excite the characteristic modes correctly. As discussed above, there is little room for freedom in the design. An antenna placement error of just 1-2 mm can degrade the isolation by 2-3 dB. Furthermore, when the user interacts with the device in which the antennas are embodied, it will change the relationship between different characteristic modes. Thus, user activity can result in the initial placement of the feeding point of the antennas being no longer optimal as discussed in greater detail below. Also, in the manufacturing and product implementation there are many limitations that could make the initial optimized structure impractical to design. One such design of the tunable slot to resolve issues such as those above is illustrated in FIG. 4. FIG. 4 illustrates a ground slot for controlling and tuning antenna isolation according to some embodiments. In FIG. 4 decoupling control of an RX antenna 405 and a TX antenna 400 can be achieved through the excitation of different modes by using the simple decoupling slot 410 in the ground plane 415 similarly to that discussed with respect to FIG. 1 but with additional dimensional specificity. In one embodiment a medium size smartphone with form factor 120 mm by 55 mm is used. Classical materials are used for the antennas, FR4 glass-reinforced epoxy laminate printed circuit board for the substrate and copper for the conductor. The concept has been studied through simulation and measurements.

Figure 5:
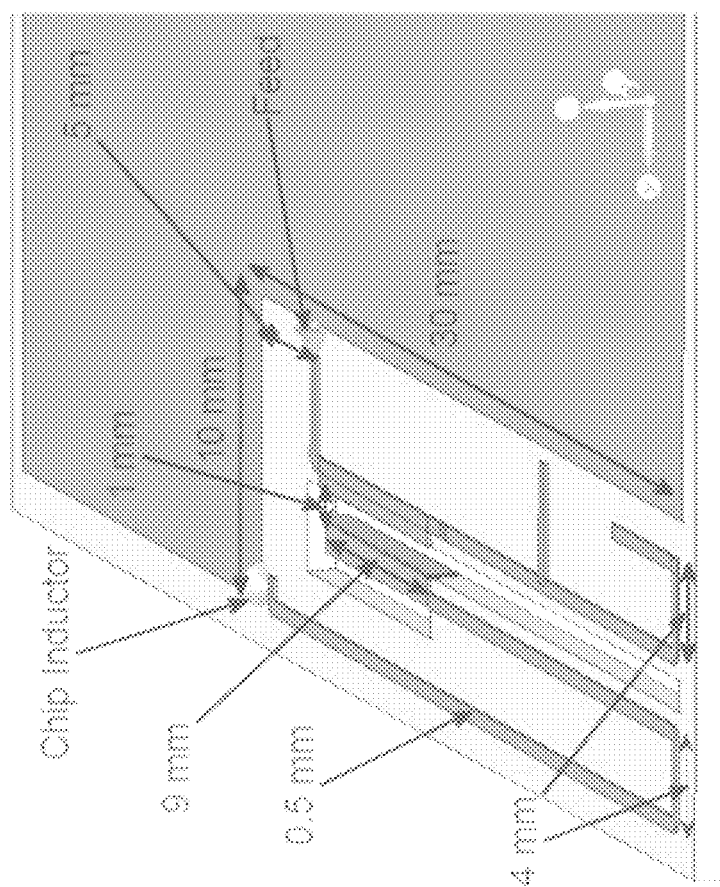
FIG. 5 illustrates an example of a receive (RX) antenna which is compatible with downlink carrier aggregation and which may be used as the RX antenna for FIG. 4 according to some embodiments.

FIG. 5 illustrates an example of an RX antenna 500 which is compatible with downlink CA and which may be used as the RX antenna 405 for FIG. 4, according to some embodiments. In FIG. 5 the RX antenna 500 is a wideband meandered monopole loaded with a chip inductor 510 of 12 nH and fed electromagnetically, as illustrated by the feed 520 in FIG. 5

Figure 6:
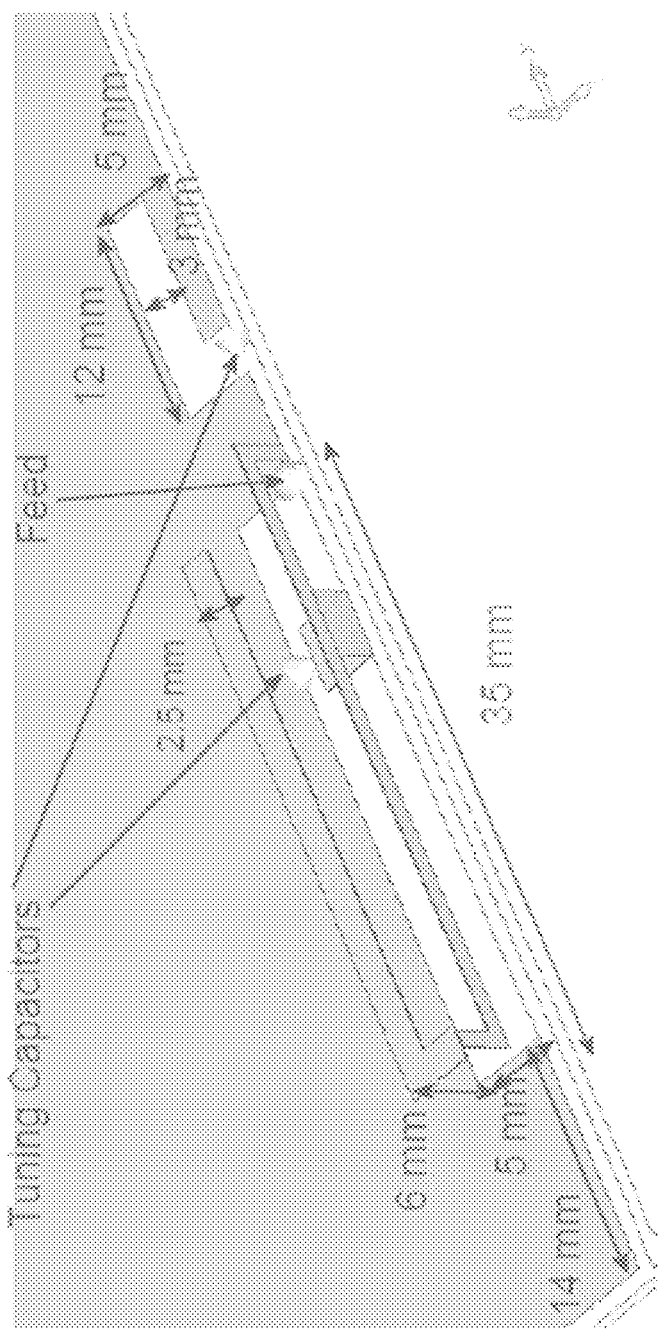
FIG. 6 illustrates a TX antenna that is usable as the TX antenna for FIG. 4 according to some embodiments.

FIG. 6 illustrates a TX antenna 600 that is usable as the TX antenna 400 of FIG. 4, according to some embodiments. The TX antenna 600 is a simple folded monopole that is capacitively loaded with a tunable capacitor 610. While specific dimensions are illustrated in FIGS. 4, 5, and 6, those of ordinary skill in the art will appreciate that other dimensions can be used, particularly in view of the above discussion of size and placement of the slot. The shape and design of the slot 620 can be optimized for each design. The placement of the slot has to couple to both the RX antenna 405 and the TX antenna 400 of FIG. 4, otherwise the slot is not on the main path of the coupling current. The size of the slot is experimentally determined. There is a tradeoff between slot size and bandwidth. If the slot is larger, the decoupling can be achieved for more frequencies. If the slot is smaller, for the same amount of tuning capacitance the decoupling would be achieved for fewer frequencies. If the slot is too small, it will have a very small effect on the path of coupling current, thus it will not have a substantial effect on the coupling level. These types of issues are to be taken into account in deciding on dimensions of an embodiment.

Figure 7:
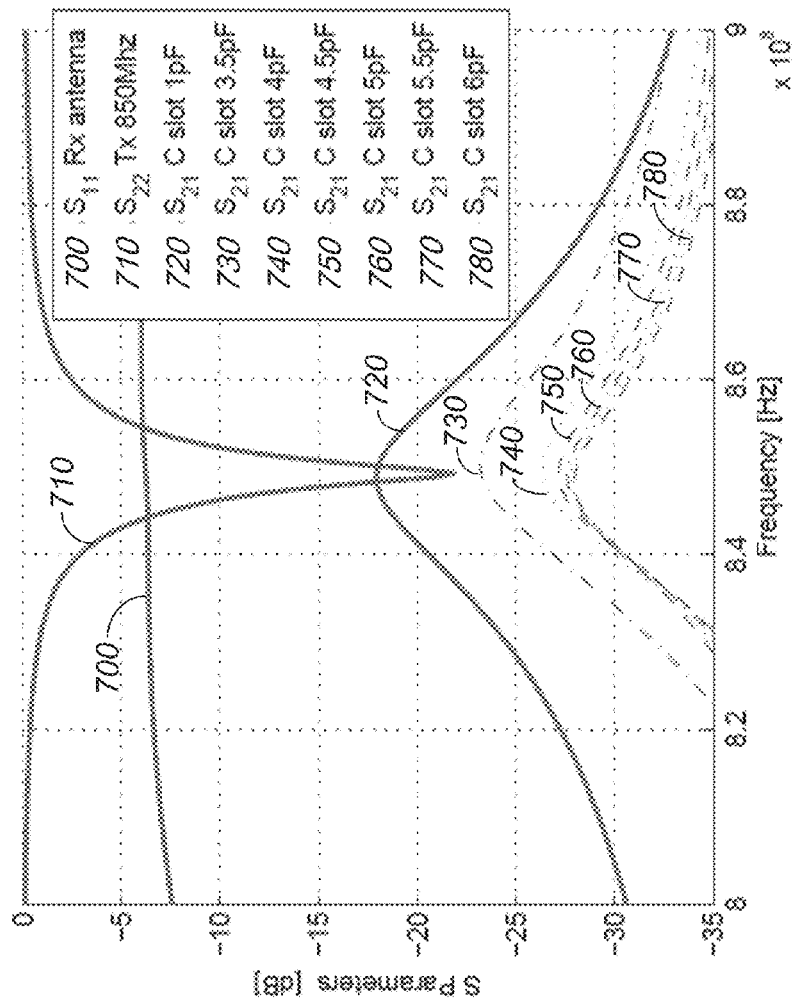
FIG. 7 illustrates simulated isolation for different values of the slot capacitor for a given TX antenna capacitor value according to some embodiments.

Some architecture where very, very high isolation is needed have tunable antennas over a wide frequency range. The tunable slot described herein works with tunable antennas as well. This can be seen from FIG. 7. FIG. 7 illustrates simulated isolation for different values of the slot capacitor for a given TX antenna capacitor value according to some embodiments. Even when the resonance frequency of the TX antenna is tuned, an improvement in isolation can be seen across substantially the entire low band due to the tunable slot. This isolation improvement is not limited to low band but operates similarly for high band as well.

Figure 8:
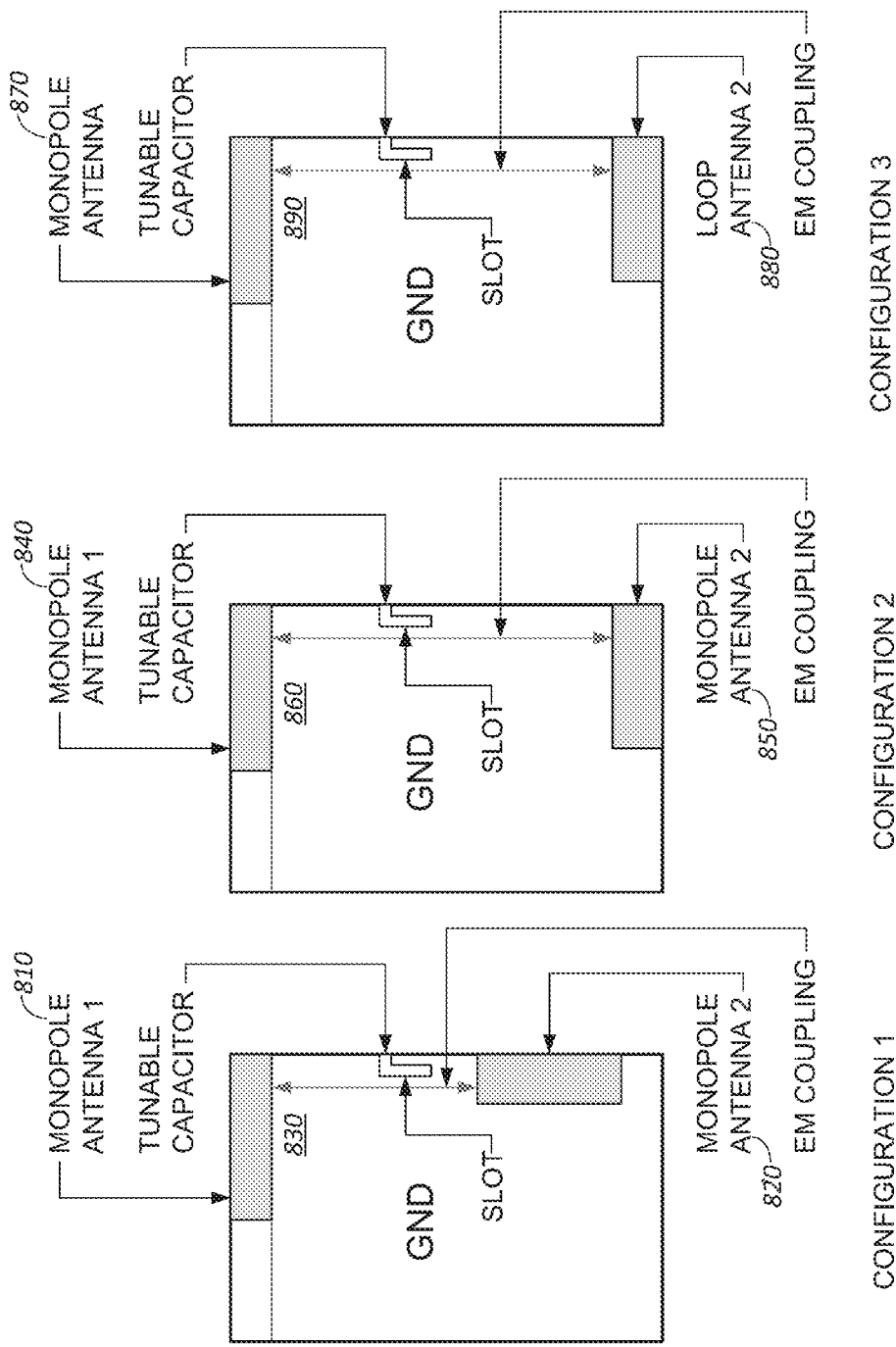
FIG. 8 illustrates three antenna/slot configurations according to some embodiments.

The tunable slot discussed above can also be used to maintain the orthogonal relationship between the two radiation modes even when the user of the device in which the antennas are implemented disturbs this orthogonal relationship. As one example, the user may place the user's hand over the antenna. The user's hand has the property of changing the resonance and the frequency of the antennas. If the resonance and the frequency of the antennas change, the electrical distance between the two antennas also changes. Therefore the tunable slot can compensate for this change to return to the electrical length (i.e., the electrical distance) between the antennas originally desired. That optimal path should be somewhere between the two extreme cases of the tuned capacitance slot discussed with respect to FIG. 1. Consequently the value of the shunt capacitor of the slot can be adjusted to bring the electrical path of the coupling current to the desired length. The capacitance may be provided by one or more distant tunable capacitors that are controlled by the microprocessor of the system. The adjustment may be made by measuring the RF isolation between one port and the other port. For example, a signal at one frequency at a first antenna can be compared to a signal at the same frequency at a second antenna. If there is a difference in magnitude or phase beyond a predetermined threshold, the microprocessor could adjust the capacitance to bring the isolation to the desired level, which could be accomplished by table lookup. In another embodiment, the phase of the coupling could be measured and a difference in phase beyond a predetermined threshold could cause the microprocessor to similarly adjust the capacitance. Generally, any mechanism that can sense the coupling between the two antennas could be used and when the electrical relationship between the two antennas has changed a certain amount, the capacitance can be adjusted to compensate for that change. A change in resonance frequency of the antennas can be an indicator of the change in coupling. Thus any mechanism designed to sense this change can be used to assess the level of the coupling indirectly. In addition to operation with dipole antennas, the tunable slot described herein can operate similarly for other antennas, including magnetic loop antennas. This is seen in FIG. 8. FIG. 8 illustrates three antenna/slot configurations according to some embodiments. As seen, Configuration 1 is the configuration of FIG. 1 with the antennas 810, 820 located perpendicularly to each other at edges of the circuit board 830, the antennas being monopoles instead of folded dipoles as in FIG. 1. Configuration 2 illustrates a configuration with the antennas 840, 850 located in parallel planes on edges of the circuit board 860. In Configuration 2 840, 850 the antennas are monopoles but other antennas such as inverted f antennas, planar inverted f antennas, patch antennas or any antenna element design that has a capacitive excitation of the ground plane can be used. At Configuration 3 the configuration includes a monopole antenna, and magnetic loop antenna or any inductive coupling antenna element. Similarly antenna 870 could be a dipole and antenna 880 a magnetic loop in Configuration 3, but with a dipole antenna the isolation would not be as effective.

While the above embodiments have been described in terms of two antennas and one slot, the embodiments are not so limited and could comprise more than two antennas and more than a single slot. In some embodiments there may be N antennas and N-1 slots. In some embodiments, the number of antennas N, may range from as few as two (N=2) to great as ten (N=10) or more. In some embodiments, N may be three (N=3). In some other embodiments, the number of antennas may be four (N=4).

Figure 9:
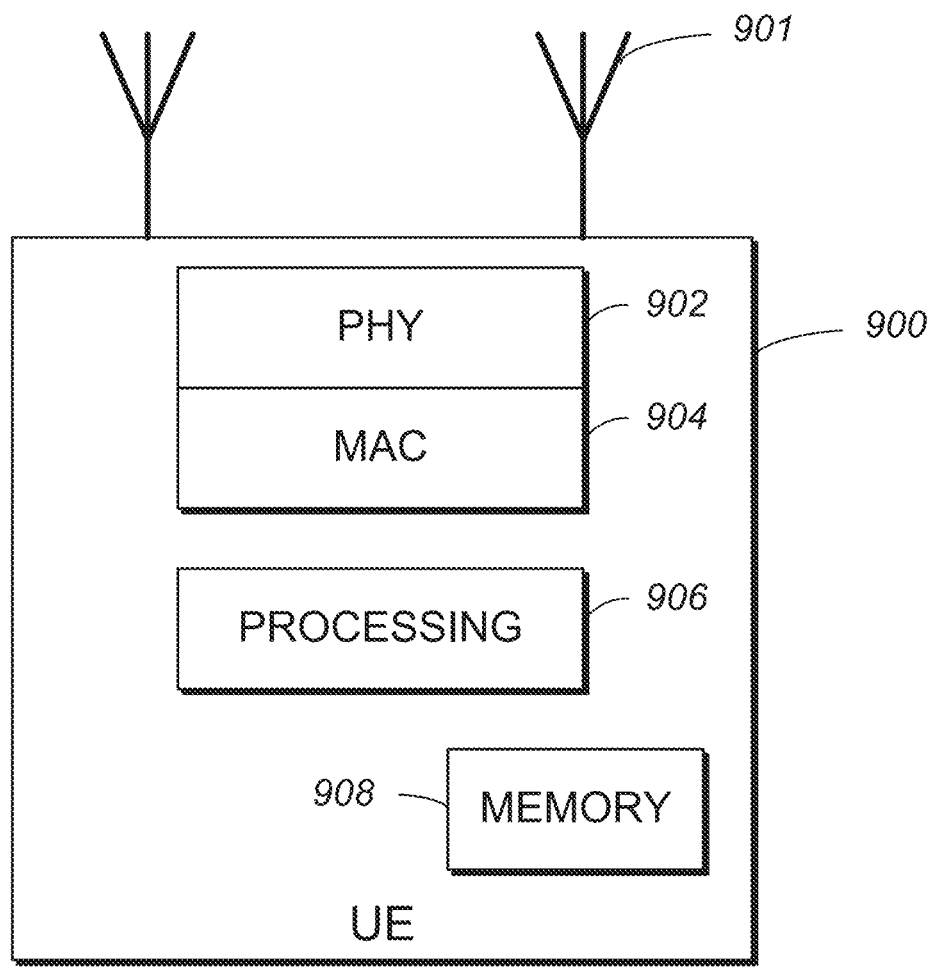
FIG. 9 illustrates a functional block diagram of user equipment (UE) according to some embodiments.

FIG. 9 illustrates a functional block diagram of a communication platform with which the antenna isolation described herein may be used, in accordance with some embodiments. In some embodiments the communication platform may be UE configured to operation in a mobile communication network, such as a 3GPP LTE network, while in other embodiments, the communication platform may be a communication station (STA) configured to operation in a Wi-Fi network. The embodiments are not limited to 3GPP LTE networks, or Wi-Fi networks. In accordance with some embodiments, the open systems interconnection media access control (MAC) circuitry 904 may be arranged to contend for a wireless medium configure frames or packets for communicating over the wireless medium and the physical layer (PHY) circuitry 902 may be arranged to transmit and receive signals. The PHY 902 may include circuitry for modulation/demodulation, upconversion/downconversion, filtering, amplification, etc. In some embodiments, the processing circuitry 906 of the UE 900 may include one or more processors. In some embodiments, two or more antennas may be coupled to the physical layer circuitry arranged for sending and receiving signals. The memory 908 may be store information for configuring the processing circuitry 906 to perform operations for configuring and transmitting UE frames and performing the various operations described herein.

In some embodiments, the communication platform 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the platform 900 may include one or more of a keyboard, a display, a non-volatile memory port, multiple antennas, a graphics processor, an application processor, speakers, and other mobile device elements. The display may be a liquid crystal display (LCD) screen including a touch screen.

The one or more antennas 901 utilized by the communication platform 900 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the communication platform 900 may be configured to receive orthogonal frequency division multiplexing (OFDM) communication signals over a multicarrier communication channel in accordance with an orthogonal frequency division multiple access (OFDMA) communication technique. The OFDM signals may comprise a plurality of orthogonal subcarriers. In some broadband multicarrier embodiments, Evolved Node Bs (eNBs) may be s may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the platform 900 and the eNBs may be configured to communicate in accordance with an OFDMA technique.

Although the communication platform 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Figure 10:
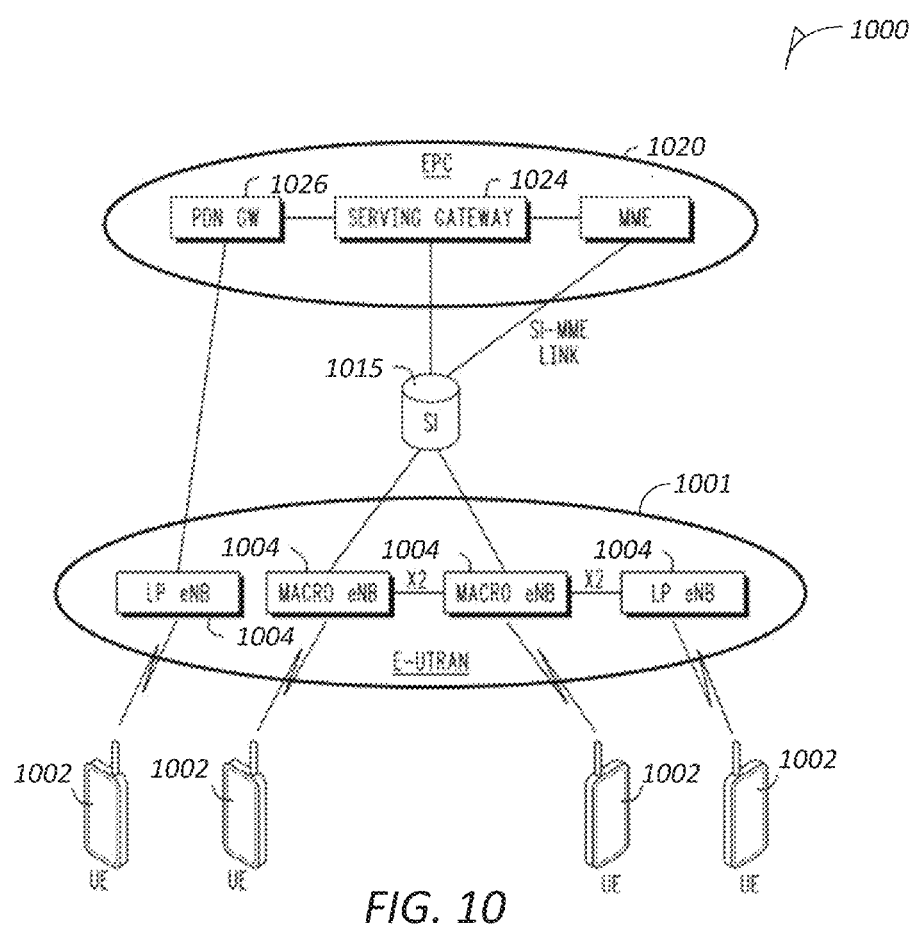
FIG. 10 illustrates shows a portion of an end-to-end network architecture of an LTE network with various components of the network in accordance with some embodiments.

FIG. 10 shows a portion of an end-to-end network architecture of an LTE network with various components of the network in accordance with some embodiments. The network 1000 comprises a radio access network (RAN) (e.g., as depicted, the E-UTRAN or evolved universal terrestrial radio access network) 1000 and the core network 1020 (e.g., shown as an evolved packet core (EPC)) coupled together through an S1 interface 1015. For convenience and brevity sake, only a portion of the core network 1020, as well as the RAN 1000, is shown.

The core network 1020 includes mobility management entity (MME) 1022, serving gateway (serving GW) 1024, and packet data network gateway (PDN GW) 1026. The RAN includes enhanced node B's (eNBs) 1004 (which may operate as base stations) for communicating with user equipment (UE) 1002. The eNBs 1004 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 1024 terminates the interface toward the RAN 1000, and routes data packets between the RAN 1000 and the core network 1020. In addition, it may be a local mobility anchor point for inter-eNB handovers and also may provide an anchor for inter-3GPP mobility. Other responsibilities may include lawful intercept, charging, and some policy enforcement. The serving GW 1024 and the MME 1022 may be implemented in one physical node or separate physical nodes. The PDN GW 1026 terminates an SGi interface toward the packet data network (PDN). The PDN GW 1026 routes data packets between the EPC 1020 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 1026 and the serving GW 1024 may be implemented in one physical node or separated physical nodes.

The eNBs 1004 (macro and micro) terminate the air interface protocol and may be the first point of contact for a UE 1002. In some embodiments, an eNB 1004 may fulfill various logical functions for the RAN 1000 including but not limited to RNC (radio network controller functions) such as radio bearer management, uplink and downlink dynamic radio resource management and data packet scheduling, and mobility management. In accordance with embodiments, UEs 1002 may be configured to communicate OFDM communication signals with an eNB 1004 over a multicarrier communication channel in accordance with an OFDMA communication technique. The OFDM signals may comprise a plurality of orthogonal subcarriers.

The S1 interface 1015 is the interface that separates the RAN 1000 and the EPC 1020. It is split into two parts: the S1-U, which carries traffic data between the eNBs 1004 and the serving GW 1024, and the S1-MME, which is a signaling interface between the eNBs 1004 and the MME 1022. The X2 interface is the interface between eNBs 1004. The X2 interface comprises two parts, the X2-C and X2-U. The X2-C is the control plane interface between the eNBs 1004, while the X2-U is the user plane interface between the eNBs 1004.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 1026. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 1002 of FIG. 10. The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, $L,=1, 2, 4$, or 8).

EXAMPLES AND ADDITIONAL NOTES

In Example 1, an antenna card can include first antenna and second antennas on a ground plane and at least one slot in the ground plane to improve the RF isolation between the first antenna and the second antenna by a path of variable electrical length that provides coupling current between the first antenna and the second antenna.

In Example 2, the antenna card of Example 1 can optionally comprise a variable reactance to tune the at least one slot in the ground plane to vary the electrical length of the path of the coupling current between the first antenna and the second antenna, wherein the variable reactance comprises one of a variable capacitance or a variable inductance.

In Example 3, the at least one slot of any one or more of Examples 1-2 can optionally comprise a variable reactance across the at least one slot, the variable reactance to tune the at least one slot to vary the electrical length of the path of the coupling current between the first antenna and the second antenna and wherein the variable reactance comprises at least one switch that changes the electrical length of the at least one slot.

In Example 4, any one or more of Examples 1-3 can optionally comprise the first antenna being resonant at a first frequency, the second antenna being resonant at the first frequency, and the at least one slot being resonant at a frequency having minimal effect on the resonance of the first antenna and on the resonance of the second antenna, and the at least one slot is tuned to provide a desired magnitude of RF isolation between the first antenna and of the second antenna in a desired frequency band In Example 5, any one or more of Examples 1-4 can optionally comprise the first antenna being resonant at a first frequency, the second antenna being resonant at a second frequency, and the at least one slot being resonant at a frequency having minimal effect on the resonance of the first antenna and on the resonance of the second antenna, and the at least one slot is tuned to provide a desired magnitude of RF isolation between the first antenna and of the second antenna in a desired frequency band In Example 6, the variable reactance of any one or more of Examples 1-5 can optionally be or comprise a switch between at least two extreme conditions, wherein at a first extreme condition coupling current from the first antenna to the second antenna flows in a single path, and at a second extreme condition the coupling current from the first antenna to the second antenna flows in two paths, and the first antenna and the second antenna operate by using aggregated carriers.

In Example 7, each of the two paths of any one or more of Examples 1-6 can optionally be on a different side of the at least one slot.

In Example 8, the antenna card of any one or more of Examples 1-7 can optionally be or comprise a measuring device to detect changes in magnitude of RF isolation, the measuring device configured to adjust the variable reactance to increase the magnitude of the RF isolation to the desired magnitude of RF isolation responsive to detection that the magnitude of RF isolation changes to less than the desired magnitude.

In Example 9, the adjustment of any one or more of Examples 1-8 can optionally be implemented by a microprocessor configured to use one of a table lookup process, an algorithm that finds the desired magnitude of RF isolation, or trial and error.

In Example 10, the measuring device of any one or more of Examples 1-9, can optionally be configured to measure a signal at a first frequency at the first antenna and a signal at the first frequency at the second antenna to detect a difference between the phase or the magnitude of the measured signals.

In Example 11 the at least one slot of any one or more of Examples 1-10 can optionally be placed on the ground plane at a location of high coupling current.

In Example 12, the first antenna and the second antenna of any one or more of Examples 1-11 can optionally operate in radiation modes with a predetermined degree of orthogonality, and variation of the electrical length of the path maintains the predetermined degree of orthogonality at substantially all frequencies of operation of the first antenna and the second antenna.

In Example 13, the predetermined degree of orthogonality of any one or more of Examples 1-12 can optionally be obtained by using the characteristic modes of the ground plane.

In Example 14, predetermined degree of orthogonality of any one or more of Examples 1-13 can optionally be achieved by one of a plurality of monopoles that excite different modes of the ground plane; or a monopole and a magnetic loop that excite different modes of the ground plane; or a dipole and a magnetic loop that excite different modes of the ground plane.

In Example 15, the antenna card of any one or more of Examples 1-14 can optionally comprise front-end module (FEM) circuitry comprising power amplifier circuitry configured to amplify signals for transmission by the antennas, and low-noise amplifier circuitry configured to amplify signals received through the antennas.

In Example 16, User Equipment (UE) can optionally be or comprise at least one radio comprising signal processing circuitry; at least a first antenna on a ground plane and a second antenna on the ground plane, the first antenna and the second antenna coupled to the signal processing circuitry to send and receive radio signals; and a UE component for providing antenna isolation, the UE component including at least one slot in the ground plane to improve RF isolation between the first antenna and the second antenna by a path of variable electrical length, the path providing the coupling current between the first antenna and the second antenna.

In Example 17, the UE component of Example 16 can optionally be or comprise a variable reactance across the at least one slot, the variable reactance to tune the at least one slot to vary the electrical length of the path of the coupling current between the first antenna and the second antenna, wherein the variable reactance comprises one of a variable capacitance or a variable inductance, or at least one switch that changes the electrical length of the at least one slot.

In Example 18, any one or more of Examples 16-17 can optionally be or comprise the first antenna being resonant at a first frequency, the second antenna being resonant at the first frequency, and the at least one slot being resonant at a frequency having minimal effect on the resonance of the first antenna and on the resonance of the second antenna, and the at least one slot is tuned to provide a desired magnitude of RF isolation between the first antenna and of the second antenna in a desired frequency band.

In Example 19, any one or more of Examples 16-18 can optionally be or comprise the first antenna being resonant at a first frequency, the second antenna being resonant at a second frequency, and the at least one slot being resonant at a frequency having minimal effect on the resonance of the first antenna and on the resonance of the second antenna, and the at least one slot is tuned to provide a desired magnitude of RF isolation between the first antenna and of the second antenna in a desired frequency band.

In Example 20, the variable reactance of any one or more of Examples 16-19 can optionally be or comprise a switch between at least two extreme conditions, wherein at a first extreme condition coupling current from the first antenna to the second antenna flows in a single path, and at a second extreme condition the coupling current from the first antenna to the second antenna flows in two paths, and the first antenna and the second antenna operate by using aggregated carriers.

In Example 21, each of the two paths of any one or more of Examples 16-20 can optionally be on a different side of the at least one slot.

In Example 22, the UE of any one or more of Examples 16-21 can optionally be or comprise a measuring device to detect magnitude of RF isolation, the measuring device configured to adjust the variable reactance to increase the magnitude of the RF isolation to the desired magnitude of RF isolation responsive to detection that the RF isolation changes to less than the desired magnitude.

In Example 23, the variable reactance of any one or more of Examples 16-22 can optionally be adjusted by a microprocessor configured to use one of a table lookup process, an algorithm that finds the desired magnitude of RF isolation, or trial and error.

In Example 24, the measuring device of any one or more of Examples 16-23 can optionally be configured to measure a signal at a first frequency at the first antenna and a signal at the first frequency at the second antenna to detect the RF isolation as a difference between the phase or the magnitude of the measured signals.

In Example 25, the at least one slot of any one or more of Examples 16-24 can optionally be placed on the ground plane at a location of high coupling current.

In Example 26, the first antenna and the second antenna of any one or more of Examples 16-25 can optionally operate in radiation modes with a predetermined degree of orthogonality, and variation in the electrical length of the path maintains the predetermined degree of orthogonality at substantially all frequencies of operation of the first antenna and the second antenna.

In Example 27, the predetermined degree of orthogonality of any one or more of Examples 16-26 can optionally be achieved by one of a plurality of monopoles that excite different modes of the ground plane; or a monopole and a magnetic loop that excite different modes of the ground plane; or a dipole and a magnetic loop that excite different modes of the ground plane.

In Example 28, a method of operating User Equipment (UE) that is configured to include at least one radio comprising signal processing circuitry; N antennas on a ground plane, the N antennas coupled to the signal processing circuitry to send and receive radio signals, N=1, 2, 3, ... n; and a UE component including N−1 slots in the ground plane to improve the RF isolation among the N antennas, wherein each individual one of the N−1 slots is associated primarily with one of the N antennas, the one of the N antennas being different for each of the N−1 slots, by varying the electrical length of the path of the coupling current from the one of the N antennas, can be or comprise sending first radio signals from the at least one radio via at least one of the N antennas to at least one Evolved Node B (eNB) and receiving second radio signals from at least one eNB via one or more of the N antennas.

In Example 29, the UE of Example 28 can optionally be or comprise a plurality of variable reactances comprising one of a variable capacitance, a variable inductor, or at least one switch, each respective variable reactance across an individual one of the N−1 slots, each respective variable reactance to tune the individual one of the N−1 slots to vary the electrical length of the path of the coupling current of the antenna with which the individual one of the N−1 slots is primarily associated.

In Example 30, an antenna card can include a plurality of N antennas on a ground plane, where N=1, 2, ... n; and a plurality of N−1 slots in the ground plane to improve the RF isolation among the plurality of N antennas, wherein each individual one of the N−1 slots is associated primarily with one of the plurality of N antennas, the one of the plurality of N antennas being different for each of the plurality of N−1 slots, by a path of variable electrical length, the path providing coupling current from the one of the plurality of N antennas.

In Example 31, the antenna card of Example 30 can optionally include a plurality of variable reactances, each respective variable reactance across an individual one of the plurality of N−1 slots, each respective variable reactance to tune the individual one of the plurality of N−1 slots to vary the electrical length of the path of the coupling current of the one of the plurality of N antennas with which the individual one of the plurality of N−1 slots is primarily associated.

In Example 32 the variable reactance of any one or more of Examples 30-31 can optionally comprise one of a variable capacitance, or a variable inductance, or at least one switch to change the electrical length of the at least one slot.

Example 33 can comprise, or can optionally be combined with any portion or combination of any portions of any one or more of Examples 1 through 32 to include subject matter that can comprise means for performing any one or more of the functions of Examples 1 through 32, or a machine-readable medium including instructions that, when performed by a machine, cause the machine to perform any one or more of the functions of Examples 1 through 32.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An antenna device comprising:
    a first antenna on a ground plane;
    a second antenna on the ground plane, the first antenna and the second antenna operating in a frequency band; and
    at least one slot in the ground plane, the at least one slot located between and separated from the first antenna and the second antenna and not resonant in the frequency band, wherein the at least one slot provides a radio frequency isolation between the first antenna and the second antenna via a path of variable electrical length that provides a coupling current between the first antenna and the second antenna, wherein the at least one slot is configured to operate as a variable reactance to vary the electrical length of the path, wherein at least some of the coupling current runs through the slot when the variable reactance tunes the slot for maximum radio frequency isolation.

2. The antenna device of claim 1 wherein the variable reactance is configured to tune the at least one slot to vary the electrical length of the path of the coupling current between the first antenna and the second antenna, wherein the variable reactance comprises a variable capacitance or a variable inductance.

3. The antenna device of claim 1 wherein the variable reactance is configured to tune the at least one slot to vary the electrical length of the path of the coupling current between the first antenna and the second antenna and wherein the variable reactance comprises at least one switch that changes the electrical length of the at least one slot.

4. The antenna device of claim 2 wherein the first antenna is resonant at a first frequency, the second antenna is resonant at the first frequency, and wherein the at least one slot is resonant at a frequency having minimal effect on the resonance of the first antenna and on the resonance of the second antenna, and the at least one slot is tuned to provide a desired magnitude of the radio frequency isolation between the first antenna and the second antenna in a desired frequency band.

5. The antenna device of claim 2 wherein the first antenna is resonant at a first frequency, the second antenna is resonant at a second frequency, and the at least one slot is resonant at a frequency having minimal effect on the resonance of the first antenna and the resonance of the second antenna, and the at least one slot is tuned to provide a desired magnitude of radio frequency isolation between the first antenna and the second antenna in a desired frequency band.

6. The antenna device of claim 2 wherein the variable reactance comprises a switch between at least two extreme conditions, wherein at a first extreme condition coupling current from the first antenna to the second antenna flows in a single path, and at a second extreme condition the coupling current from the first antenna to the second antenna flows in two paths, and the first antenna and the second antenna operate by using aggregated carriers.

7. The antenna device of claim 6 wherein each of the two paths is on a different side of the at least one slot.

8. The antenna device of claim 2 further comprising:
a measuring device to detect changes in magnitude of radio frequency isolation, the measuring device configured to adjust the variable reactance to increase the magnitude of radio frequency isolation to a desired magnitude of radio frequency isolation responsive to detection that the magnitude of radio frequency isolation changes to less than the desired magnitude.

9. The antenna device of claim 8 wherein the adjustment is implemented by a microprocessor configured to use one of a table lookup process, an algorithm that finds the desired magnitude of radio frequency isolation, or trial and error.

10. The antenna device of claim 8 wherein the measuring device is configured to measure a signal at a first frequency at the first antenna and a signal at the first frequency at the second antenna to detect the magnitude of radio frequency isolation as a difference between the phase or the magnitude of the measured signals.

11. The antenna device of claim 1 wherein the at least one slot is placed on the ground plane at a location of high coupling current.

12. The antenna device of claim 2 wherein the first antenna and the second antenna operate in radiation modes with a predetermined degree of orthogonality, and variation of the electrical length of the path maintains substantially the predetermined degree of orthogonality at substantially all frequencies of operation of the first antenna and the second antenna.

13. The antenna device of claim 12 wherein the predetermined degree of orthogonality is obtained by using characteristic modes of the ground plane.

14. The antenna device of claim 12 wherein the predetermined degree of orthogonality is achieved by one of:
a plurality of monopoles that excite different modes of the ground plane; or
a monopole and a magnetic loop that excite different modes of the ground plane; or
a dipole and a magnetic loop that excite different modes of the ground plane.

15. The antenna device of claim 1 further comprising front-end module (FEM) circuitry comprising power amplifier circuitry configured to amplify signals for transmission by at least one of the first antenna and the second antenna, and low-noise amplifier circuitry configured to amplify signals received through at least one of the first antenna and the second antenna.

16. User Equipment (UE) comprising:
a one radio comprising signal processing circuitry;
a first antenna on a ground plane and a second antenna on the ground plane, the first antenna and the second antenna operating in a frequency band, the first antenna and the second antenna coupled to the signal processing circuitry to send and receive radio signals; and
a UE component for providing antenna isolation, the UE component including at least one slot in the ground plane, the at least one slot located between and separated from the first antenna and the second antenna and not resonant in the frequency band, wherein the at least one slot provides radio frequency isolation between the first antenna and the second antenna via a path of variable electrical length that provides coupling current between the first antenna and the second antenna, wherein the at least one slot is configured to operate as a variable reactance to vary the electrical length of the path, wherein at least some of the coupling current runs through the slot when the variable reactance tunes the slot for maximum radio frequency isolation.

17. The UE of claim 16, wherein the variable reactance tunes the at least one slot to vary the electrical length of the path of the coupling current between the first antenna and the second antenna, wherein the variable reactance comprises one of a variable capacitance or a variable inductance or at least one switch, that changes the electrical length of the at least one slot.

18. The UE of claim 16 wherein the first antenna is resonant at a first frequency, the second antenna is resonant at the first frequency, and wherein the at least one slot is resonant at a frequency having minimal effect on the resonance of the first antenna and the resonance of the second antenna, and the at least one slot is tuned to provide a desired magnitude of radio frequency isolation between the first antenna and of the second antenna in a desired frequency band.

19. The UE of claim 16 wherein the first antenna is resonant at a first frequency, the second antenna is resonant at a second frequency, and the at least one slot is resonant at a frequency having minimal effect on the resonance of the first antenna and the resonance of the second antenna, and the at least one slot is tuned to provide a desired magnitude of radio frequency isolation between the first antenna and the second antenna in a desired frequency band.

20. The UE of claim 19 wherein the variable reactance comprises a switch configured to switch between at least two extreme conditions, wherein at a first extreme condition coupling current from the first antenna to the second antenna flows in a single path, and at a second extreme condition the coupling current from the first antenna to the second antenna flows in two paths, and the first antenna and the second antenna operate by using aggregated carriers.

21. The UE of claim 20 wherein each of the two paths is on a different side of the at least one slot.

22. The UE of claim 17 further comprising:
a measuring device to detect magnitude of radio frequency isolation, the measuring device configured to adjust the variable reactance to increase the magnitude of radio frequency isolation to a desired magnitude of radio frequency isolation responsive to detection that the magnitude of radio frequency isolation changes to less than the desired magnitude.

23. The UE of claim 22 wherein the variable reactance is adjusted by a microprocessor configured to use one of a table lookup process, an algorithm that finds the desired magnitude of radio frequency isolation, or trial and error.

24. The UE of claim 23 wherein measuring device is configured to measure a signal at a first frequency at the first antenna and a signal at the first frequency at the second antenna to detect the magnitude of radio frequency isolation as a difference between the phase or the magnitude of the measured signals.

25. The UE of claim 16 wherein the at least one slot is placed on the ground plane at a location of high coupling current.

26. The UE of claim 17 wherein the first antenna and the second antenna operate in radiation modes with a predetermined degree of orthogonality, and variation in the electrical length of the path maintains substantially the predetermined degree of orthogonality at substantially all frequencies of operation of the first antenna and of the second antenna.

27. The UE of claim 26 wherein the predetermined degree of orthogonality is achieved by one of:
   a plurality of monopoles that excite different modes of the ground plane; or
   a monopole and a magnetic loop that excite different modes of the ground plane; or
   a dipole and a magnetic loop that excite different modes of the ground plane.

* * * * *